United States Patent Office 3,629,252
Patented Dec. 21, 1971

3,629,252
3-ARYLIMINO-4-CHLORO-5-AMINO-1,2-DITHIOLS
Jorg Bader, Arlesheim, and Karl Gatzi, Basel, Switzerland, assignors to Ciba-Geigy Corporation, Ardsley, N.Y.
No Drawing. Filed May 28, 1969, Ser. No. 828,779
Claims priority, application Switzerland, June 7, 1968, 8,517/68
Int. Cl. C07d 71/00, 87/38
U.S. Cl. 260—247.1                    4 Claims

ABSTRACT OF THE DISCLOSURE 3-arylimino-4-chloro-5-amino-1,2-dithiols are disclosed as antifungal and bactericidal agents. They are particularly useful for the protection of plants against phytopathogenic fungi. Antifungal compositions containing them as active ingredients are also described.

DETAILED DISCLOSURE

The present invention concerns novel 3-arylimino-4-chloro-5-amino-1,2-dithiols, processes for the production thereof, as well as agents containing such dithiols as active ingredients for controlling phytopathogenic fungi, and methods of combating phytopathogenic fungi using the novel active substances or agents containing them.

It has been found that the novel 3-arylimino-4-chloro-5-amino-1,2-dithiols and their acid addition salts have good fungicidal and partly also bactericidal activity while their toxicity for warm blooded animals is low. This is surprising since 4,5-dichloro-1,2-dithiol-3-one, known from the German Patent No. 1,102,174 does not have these properties.

The new 3-arylimino-4-chloro-5-amino-1,2-dithiols correspond to the formula:

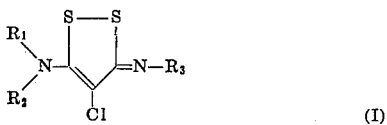

(I)

In this formula
$R_1$ represents lower alkyl, a phenyl radical any substituent of which is selected from chlorine, bromine, lower alkyl and lower alkoxy,
$R_2$ represents hydrogen or lower alkyl, or
$R_1$ and $R_2$ together represent a polymethylene radical of from 2 to 6 carbon atoms, the 3-aza-pentamethylene, 3-lower alkyl-3-aza-pentamethylene or 3-oxy-pentamethylene radical and
$R_3$ represents a phenyl radical any substituent of which is selected from chlorine, bromine, lower alkyl and lower alkoxy.

In Formula I, when $R_1$ and $R_2$ represent lower alkyl, they represent straight or branched-chain radicals having 1 to 5 carbon atoms, e.g. methyl, ethyl, n-propyl, isopropyl, n-butyl, sec-butyl, isobutyl, tert-butyl and pentyl radicals. A substituted phenyl radical has preferably 1 to 3 substituents; the several substituents can be the same or different. Examples thereof are in particular: chlorine, bromine, lower alkyl or lower alkoxy. As lower alkyl, the radicals mentioned above can be used; the same radicals constitute the alkyl part of alkoxy substituents.

The novel 3-arylimino-4-chloro-5-amino-1,2-dithiols of Formula I are produced according to the invention by reacting 3,4,5-trichloro-1,2-dithiolium chloride either (a) in arbitrary sequence with one equivalent each of an amine of the Formulas II and III, respectively,

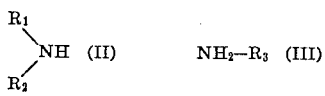

or (b) with 2 equivalents of an amine of Formula III, in which formulae the symbols $R_1$, $R_2$ and $R_3$ have the meanings given under Formula I, and converting, if desired, the so obtained compounds into their addition salts with inorganic and organic acids.

The reaction is advantageously performed in the presence of an acid-binding agent. Suitable acid-binding agents are tertiary amines such as trialkyl amines, pyridine, N,N-dialkyl-aniline, etc., as well as weak inorganic bases, e.g. sodium hydrogen carbonate, sodium carbonate, magnesium or calcium carbonate. Furthermore, the amines of Formulas II and III, when used in the reaction in excess of the required amount, can serve as acid-binding agents. Furthermore it is expedient to perform the process according to the invention in the presence of solvents and/or diluents which are inert to the reaction components being used. Examples of those suitable for this purpose are the following: water, aromatic hydrocarbons, chlorinated aliphatic and aromatic hydrocarbons, alcohols, ethers, N,N-dialkylated carbonic acid amides, sulfoxides, as well as mixtures of water with such solvents. The reaction temperatures are preferably between —30 and +80° C.

By the reaction of 3,4,5-trichloro-1,2-dithiolium chloride with an amine of Formula III, in the first step new 3-arylamino-4,5-dichloro-1,2-dithiols of Formula IV

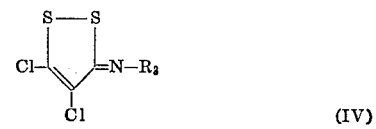

(IV)

in which $R_3$ has the meaning given under Formula I, are obtained as intermediates.

The 1,2-dithiols of Formula IV can be isolated as such or in the form of their hydrochloride, depending on the type and amount of acid-binding agent employed.

In order to form acid addition, salts, the compounds of Formula I are advantageously combined with the following acids: hydrochloric, hydrobromic, sulfuric, nitric, formic, acetic, propionic, sorbic, benzoic, phthalic, oxalic, succinic and citric acid.

The novel 3-arylimino-4-chloro-5-amino-1,2-dithiols of Formula I have an excellent action against numerous phytopathogenic fungi. The new active substances are effective against fungi causing plant diseases, for example powdery mildrews such as powdery mildew of cucumbers (*Erysiphe cichoracearum*) and powdery mildrew of roses (*Sphaerotheca pannosa*); downy mildews such as those causing late blight on leaves and tubers of potatoes (*Phytophthora infestans*); leaf spot pathogens such as *Alternaria solani*; rust such as bean rust (*Uromyces app.*); furthermore, grey mould (*Botrytis cinerea*) which is particularly difficult to control, etc. Since the 1,2-dithiols of Formula I also act as systemic fungicides, they can be used to protect plants and new growths thereon after treatment, against further fungal infections. The new active substances can also be used for the treatment of seeds without impairing germination. The active substances are used for the protection of plants in the form of solid or liquid preparations such as dusts or scattering agents, granulates, or dispersions (suspensions or emulsions). The concentrations of the active substance in the preparations required for plant protection are in the range of 0.01 to 2% of the weight of the preparation, the amount of active substance to be applied ranges between 0.1 and 7 kg./ha., depending largely, however, on the type of plants to be protected.

Several of the new active substances can also be used to control fungi and bacteria which infect other organic materials, in particular keratinic, cellulosic, and synthetic materials, and paints. The active substances can also be used for disinfection of the soil. They have only slight toxicity for warm-blooded animals.

The fungicidal action of the 3-arylimino-4-chloro-5-amino-1,2-dithiols of Formula I was determined by the following test.

ACTION AGAINST *Botrytis cinere* on *Vicia Faba* (BROADBEANS)

Three well developed leaves of *Vicia faba* of equal size are placed into each test Petri dish which has been lined with moistened filter paper; the leaves are then sprayed until dripping wet with a liquor prepared from the active substance in the form of a wettable powder (0.1% active ingredient). After the spray coating has dried, the leaves are infected with a freshly prepared fungi spore suspension. After the leaves have been kept for 1–2 days in a moist atmosphere at 18–20° C., in case of infection, black spots appear, at first in the form of tiny spots, which quickly spread out. The number and size of the infected spots serve as the criterion for measuring the effectiveness of the test substance.

EVALUTION

The activity is evaluated according to the following scale:

10=inactive, infection equal to that on untreated control plants
9–1=linear decrease in infection
0=no infection Compounds: Effect
3-(4'-chlorophenylimino) - 4 - chloro-5-dimethyl-amino-1,2-dithiol _____ 0
3-(4' - chlorophenylimino)-4-chloro-5-morpholino-1,2-dithiol _____ 0
3 - (3',4' - dichlorophenylimino)-4-chloro-5-morpholino-1,2-dithiol _____ 0

The following examples illustrate the processes for the production of the new compounds of Formula I.

The temperatures are given in degrees centigrade, and parts are expressed by weight.

Example 1

(a) A mixture of 99 parts of 4-chloroaniline, 158 parts of triethylamine and 500 parts of ether is added dropwise with stirring at −20° to −30° to a suspension of 189 parts of 3,4,5-trichloro-1,2-dithiolium chloride in 200 parts by volume of diethyl ether. This mixture is then stirred at 25° for 12 hours. Then it is filtered, the filter residue is washed three times with 300 parts by volume each of ether, and the filtrate is concentrated to about 400 parts by volume. Hereby a small amount of a brown oil precipitates, which is decanted. The solution is then shaken with active charcoal, filtered and cooled to −60°. Thereby 3-(4'-chlorophenylimino)-4,5-dichloro - 1,2-dithiol crystallizes as yellow needles having a melting point of 94–95°. Yield: 72 parts (31% of the theoretical).

Analogously thereto the following compounds are obtained:

M.P. (degrees)
3-phenylimino-4,5-dichloro-1,2-dithiol _____ 78–79
3-(2',4'-dichlorophenylimino) - 4,5 - dichloro-1,2-dithiol _____ 81–82
3-(3',4'-dichlorophenylimino) - 4,5 - dichloro-1,2-dithiol _____ 86–88
3-(4'-methoxyphenylimino) - 4,5 - dichloro-1,2-dithiol _____ 82–83

(b) A solution of 6 parts of dimethylamine in 24 parts by volume of 1,2-dimethoxyethane is added dropwise, while stirring and cooling with ice, to a solution of 15 parts of 3-(4'-chlorophenylimino)-4,5-dichloro-1,2-dithiol in 35 parts by volume of chlorobenzene. The mixture obtained is allowed to stand for 3 days at 25°. The dimethylaminehydrochloride which precipitated is filtered. The filtrate is concentrated by evaporation and the residue is recrystallized from ethylene glycol monomethyl ether. 5 parts of 3 - (4'-chlorophenylimino)-4-chloro-5-dimethylamino-1,2-dithiol is obtained as yellow needles having a melting point of 119–120°.

Example 2

24 parts of 3,4,5-trichloro-1,2-dithiolium chloride are suspended in 50 parts by volume of ether, and while stirring without cooling a solution of 10 parts of triethylamine and 14 parts of 3-chloroaniline in ether is added dropwise thereto during one hour. The mixture is stirred at 25° for 15 hours, then filtered, and the filtrate is concentrated by evaporation. The residue solidifies during the course of several days. It is dissolved and reprecipitated from methyl Cellosolve/water and then recrystallized from methanol. 3-(3'-chlorophenylimino)-4-chloro-5-(3''-chlorophenylamino)-1,2-dithiol is obtained as fine yellow needles.

$C_{15}H_9Cl_3N_2S_3$ (387.7).—Calculated (percent): C, 46.5; H, 2.3; Cl, 27.5; N, 7.2; S, 16.9. Found (percent): C, 46.9; H, 2.3; Cl, 27.4; N, 7.2; S, 16.5.

According to these examples the following compounds were obtained:

M.P. (degrees)
3 - (4' - chlorophenylimino)-chloro - 5 - morpholino-1,2-dithiol _____ 133–134
3 - (3',4' - dichlorophenylimino) - 4 - chloro-5-morpholino-1,2-dithiol _____ 121–123
3 - (4' - tolylimino) - 4-chloro-5-dimethylamino-1,2-dithiol _____ _____
3 - (4' - chlorophenylimino) - 4 - chloro - 5-diethylamino-1,2-dithiol _____ 75–76
3 - (4' - chlorophenylimino) - 4 - chloro - 5-piperidino-1,2-dithiol _____ 84–85

The production of fungicidal agents according to the invention is performed in a known manner by intimate mixing and grinding of active substances of the general Formula I together with suitable carriers, optionally with the addition of dispersing agents or solvents, which are inert towards the active substances. The active substances can be used and applied in the following forms:

solid preparations: dusts, scattering agents, granulates, coated granulates, impregnated granulates and homogeneous granulates;
water-dispersible concentrates of the active substance: wettable powders, pastes, emulsions;
liquid preparations: solutions, aerosols.

For the production of solid preparations (dusts, scattering agents, granulates) the active ingredients are mixed with solid carriers. Suitable particle size of the carrier is up to about 0.1 mm. for dusts, from about 0.075 to 0.2 mm. for scattering agents, and 0.2 mm. or more for granulates. The concentration of active ingredient in the solid preparation is usually 0.5 to 80% by weight. These mixtures can also contain additives which stabilize the active ingredient and/or substances which are non-ionic, or anionically or cationically active, which substances, for example, improve the adhesion of the active ingredients on plants or parts of plants (adhesives and agglutinants) and/or ensure a better wettability (wetting agents) and dispersibility (dispersing agents).

Water-dispersible concentrates of the active substance, wettable powders, pastes and emulsion concentrates, are agents which can be diluted with water to any desired concentration. They consist of active substance, carrier, optionally additives for stabilizing the active substance, surface-active substances and anti-foaming agents, and optionally solvents. The concentration of active substance in these preparations is from 5 to 80% by weight. The wettable powders and pastes are obtained by mixing and grinding the active substances with dispersing agents and pulverulent carriers in suitable equipment until the products are homogeneous. In some cases it is advantageous to use mixtures of different carriers. The anti-foaming agents may, for example, be silicones. The active substances are so mixed, ground, sieved and classified with the above-mentioned additives that in the wettable powders the solid fraction does not exceed a grain size of 0.02 to 0.04 and in pastes does not exceed 0.003 mm. Dispersing agents, organic solvents and water are used for the preparation of emulsion concentrates and pastes. The solvents must be practically odorless, non-phytotoxic, inert towards the active substances and not easily combustible.

Furthermore, the agents according to the invention may be applied in the form of solutions. For this purpose, one or more of the active substances of the general Formula I is or are dissolved in suitable organic solvents, mixtures of solvents, or water. The concentration of the active substances contained in the solutions should be in the range of 1 to 20% by weight.

Other biocidal active substances or agents can be admixed with the agents described according to the invention. Thus, in addition to the said compounds of the general Formula I and other fungicides, the new agents may contain, for example, insecticides, herbicides, bactericides, fungistatic and bacteriostatic substances or nematocides in order to broaden the range of action. The agents according to the invention may also contain plant fertilizers, trace elements, etc.

Preparations containing the active substances, which are suitable for the protection of plants, are described below. Where not otherwise specifically stated, parts and percentages are expressed by weight.

DUSTS

The following components are used for the preparation of (a) a 10% and (b) a 2% dust:

(a)

10 parts of 3-(4'-chlorophenylimino)-4-chloro-5-dimethylamino-1,2-dithiol,
5 parts of highly dispersed silicic acid,
85 parts of talcum;

(b)

2 parts of 3 - (3' - chlorophenylimino)-4-chloro-5-(3''-chlorophenylamino)-1,2-dithiol,
1 part of highly dispersed silicic acid,
97 parts of talcum.

The above-named active substances are intimately mixed and ground with the carriers. The fungicidal dusting agents thus obtained serve for treating seed beds or for dusting plants.

SEED DRESSINGS

The following are used for the preparation of (a) a 10% and (b) a 60% seed dressing:

(a)

10 parts of 3 - (4' - chlorophenylimino)-4-chloro-5-piperidino-1,2-dithiol,
5 parts of kieselguhr,
1 part of liquid paraffin,
84 parts of talcum;

(b)

60 parts of 3 - (3',4'-dichlorophenylimino)-4-chloro-5-morpholino-1,2-dithiol,
15 parts of kieselguhr,
1 part of liquid paraffin,
24 parts of talcum.

The active substances mentioned are intimately mixed in a mixer with the above-given carriers and the paraffin as distributing agent, and then ground. The pulverulent dressings obtained serve for treating seeds of all types.

GRANULATES

The following components are used for the preparation of (a) a 2.5% and (b) a 5% granulate:

(a)

2.5 parts of 3-(3'-chlorophenylimino)-4-chloro-5-(3''-chlorophenylamino)1,2-dithiol,
2.5 parts of kieselguhr,
5 parts of polyethylene glycol,
89.3 parts of ground limestone (0.4–0.8 mm.),
0.7 part of silicic acid;

(b)

5 parts of 3-(4'-chlorophenylimino)-4-chloro-5-piperidino-1,2-dithiol,
1.5 parts of kieselguhr,
0.5 part of cetyl polyglycol ether,
87 parts of ground limestone,
5 parts of polyethylene glycol,
1 part of silicic acid.

The ground limestone is impregnated with the polyethylene glycol or the cetyl polyglycol ether, respectively, and then mixed with a mixture of the active substance mentioned, the kieselguhr and silicic acid. These granulates are particularly suitable for the disinfection of seed beds.

WETTABLE POWDERS

The following components are used for the preparation of (a) 25%, (b) and (c) 40%, and (d) 10% wettable powders:

(a)

25 parts of 3-(3',4'-dichlorophenylimino)-4-chloro-5-morpholino-1,2-dithiol,
25 parts of kieselguhr,
2 parts of hexadecyl glycol ether sulfate,
1 part of sodium lauryl sulfate,
7 parts of sodium lignin sulfate,
40 parts of kaolin;

(b)

40 parts of 3-(3'-chlorophenylimino)-4-chloro-5-(3''-chlorophenylamino)-1,2-dithiol,
5 parts of dibutyl naphthyl sulfonate sodium salt,
6 parts of naphthalene sulfonic acid/phenol sulfonic acid/formaldehyde condensation product (3:2:1),
5 parts of Champagne chalk,
3 parts of kaolin/polyvinyl alcohol mixture (1:1),
30 parts of silicic acid (precipitated),
11 parts of kaolin;

(c)

40 parts of 3-(4'-chlorophenylimino)-4-chloro-5-dimethylamino-1,2-dithiol,
2 parts of oleyl methyl tauride sodium salt,
6 parts of naphthalene sulfonic acid/phenol sulfonic acid/formaldehyde condensation product (3:2:1),
2 parts of kaolin/polyvinyl alcohol mixture (1:1),
20 parts of kaolin,
30 parts of silicic acid (precipitated);

(d)

10 parts of 3-(3'-chlorophenylimino)-4-chloro-5-(3''-chlorophenylamino)-1,2-dithiol,
10 parts of sodium lignin sulfonate,
2 parts of a finely ground mixture of kaolin and polyvinyl alcohol (1:1),
10 pars of kieselguhr,
38 parts of kaolin,
30 parts of Champagne chalk.

The active substances given are mixed with the carriers and dispersing agents, and finely ground. A wettable powder of excellent wettability and suspensibility is obtained. By dilution with water, suspensions of any desired concentration of active substance can be obtained from such wettable powders. They are suitable for the treatment of cultivated plants such as fruit trees, roses, etc.

EMULSION CONCENTRATES

The following components are used to prepare (a) a 5%, (b) a 10%, and (c) a 15% emulsion concentrate:

(a)

5 parts of 3-(4'-chlorophenylimino)-4-chloro-5-dimethylamino-1,2-dithiol,
40 parts of dimethyl formamide,
50 parts of petroleum (boiling range 230–270°),
5 parts of composite emulsifier consisting of the calcium salt of dodecylbenzene sulfonic acid and a condensation product of ethylene oxide and castor oil (e.g. "Emullat WK," produced by Union Chimique Belge, S.A., Brussels);

(b)

10 parts of 3-(3',4'-dichlorophenylimino)-4-chloro-5-piperidino-1,2-dithiol,
35 parts of dimethyl formamide,
50 parts of petroleum (boiling range 230–270°),
5 parts of the composite emulsifier given under (a);

(c)

15 parts of 3-(3'-chlorophenylimino)-4-chloro-5-(3''-chlorophenylamino)-1,2-dithiol,
27 parts of dimethyl formamide,
53 parts of petroleum (boiling range 230–270°),
5 parts of the composite emulsifier given under (a).

The active ingredient used is dissolved in petroleum or dimethyl formamide and the composite emulsifier is added to this solution. Emulsion concentrates are obtained which can be diluted with water to any concentration desired. Such emulsions are suitable for the treatment of cultivated plants, e.g. leguminosae, stone fruit trees and kernel fruit trees, decorative shrubs and plants.

We claim:
1. A compound selected from a dithiol of the Formula I

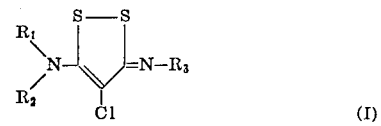

(I)

wherein
$R_1$ represents lower alkyl of at most 5 carbon atoms, a phenyl radical any substituent of which is selected from chlorine, bromine, lower alkyl and lower alkoxy,
$R_2$ represents hydrogen or lower alkyl or
$R_1$ and $R_2$ together represent a polymethylene radical of from 2 to 6 carbon atoms, 3-aza-pentamethylene, 3-lower alkyl-3-aza-pentamethylene or 3-oxy-pentamethylene,
$R_3$ represents a phenyl radical which may be mono- or poly-substituted by chlorine, bromine, lower alkyl or lower alkoxy, and an agriculturally acceptable addition salt thereof with an acid.

2. 3-(4'-chlorophenylimino) - 4 - chloro-5-dimethylamino-1,2-dithiol.

3. 3-(3,4-dichlorophenylimino) - 4 - chloro-5-morpholino-1,2-dithiol.

4. 3-(4'-chlorophenylimino) - 4 - chloro-5-morpholino-1,2-dithiol.

References Cited

UNITED STATES PATENTS 2,846,444    8/1958    Luettringhaus et al. __260—327
3,527,867    9/1970    Bader et al. _____ 424—277

HENRY R. JILES, Primary Examiner

C. M. SHURKO, Assistant Examiner

U.S. Cl. X.R.

260—268 H, 293.4 E, 326.84, 327 C; 424—248, 250, 267, 274, 277